United States Patent [19]

Nishio et al.

[11] Patent Number: 6,041,037
[45] Date of Patent: Mar. 21, 2000

[54] ATM VIRTUAL PATH SWITCHING NODE

[75] Inventors: Makoto Nishio; Hiromitsu Watanabe, both of Tokyo, Japan

[73] Assignee: NEC Corporation, Japan

[21] Appl. No.: 08/912,739

[22] Filed: Aug. 18, 1997

[30] Foreign Application Priority Data

Aug. 19, 1996 [JP] Japan .................................. 8-217255

[51] Int. Cl.[7] ............................ G01R 31/08; G06F 11/00
[52] U.S. Cl. .......................... 370/228; 370/216; 370/218; 370/242; 340/827
[58] Field of Search .................................... 370/216, 218, 370/223, 225, 227, 228, 244; 340/827, 827.01

[56] References Cited

U.S. PATENT DOCUMENTS

| 5,150,356 | 9/1992 | Tsutsui ..................................... 370/223 |
| 5,239,537 | 8/1993 | Sakauchi .................................. 370/218 |
| 5,600,630 | 2/1997 | Takano et al. ........................... 370/218 |
| 5,781,528 | 7/1998 | Sato et al. ................................ 370/218 |
| 5,867,481 | 2/1999 | Miyagi ..................................... 370/244 |

OTHER PUBLICATIONS

H. Shimizu, et al. "ATM–LAN", Soft Research Center, Feb. 10, 1995 (No Translation).
Y. Fujita, et al., "ATM VP Protection Switching and Applications", Proceedings of International Switching Symposium, P.g20, Apr. 1995, pp. 82–86.

*Primary Examiner*—Hassan Kizou
*Assistant Examiner*—John Pezzlo
*Attorney, Agent, or Firm*—Ostrolenk, Faber, Gerb & Soffen, LLP

[57] ABSTRACT

In an ATM virtual path switching node, upon being notified of a current virtual path by a virtual path monitoring unit, a link fault determination unit compares the number of faulty current virtual paths with a predetermined threshold value. When the number of faulty current virtual paths is equal to or larger than the threshold value, a link fault is determined, and a message communication unit transmits/receives a link fault notification signal to/from another ATM virtual path switching node. When the number of faulty current virtual paths is smaller than the threshold value, a current virtual path fault is determined, and the message communication unit transmits/receives a virtual path fault notification signal to/from another ATM virtual path switching node. The message communication unit transmits a switching control signal for designating switching from the current virtual path to a stand-by virtual path. A current virtual path information management unit manages correspondence between the current virtual path having, as one switching terminal, a self ATM virtual path switching node and a plurality of links in an ATM network.

4 Claims, 7 Drawing Sheets

ATM VIRTUAL PATH SWITCHING NODE

BACKGROUND OF THE INVENTION

1. Field of the Invention

The present invention relates to an ATM virtual path switching node which switches a virtual path influenced by various faults generated in an asynchronous transfer mode (to be simply referred to as ATM hereinafter) network to another virtual path as a detour, thereby recovering the path from the faults.

2. Description of the Prior Art

In recent years, as the bandwidth has broadened along with the progress in the optical fiber transmission technology, a broadband ISDN (BISDN) which integrally accommodates various communication services for voice, character, and image data and provides these services to subscribers is becoming more important. An essential network technology for realizing the BISDN is the ATM technology. In ATM, any information is segmented into packets called cells each having a fixed length, and a header necessary for routing is added to each packet, thereby transmitting the information, as described in Hiroshi Shimizu & Hiroshi Suzuki, "ATM-LAN", Soft Research Center. In this case, the cell is transmitted to a receiving ATM node or terminal on two logical connections, i.e., a virtual circuit and a virtual path.

The virtual circuit is a connection set for every call generated by assigning network resources (a route and a band) necessary for communication among a plurality of terminals in accordance with signaling procedures.

The virtual path is a logical transmission line which is semi-permanently set in advance between predetermined nodes in advance in accordance with the predicted traffic demand for between nodes such as switching systems or transmission apparatuses in the ATM network or the result of monitoring the actual amount of traffic. The virtual path does not depend on the network topology formed by actually connecting transmission lines such as optical fibers and coaxial cables. The virtual path accommodates a plurality of virtual circuits.

As a conventional method of recovering the virtual path from a fault generated in the ATM network, an ATM virtual path switching method is used (Yoshitaka Fujita et al., "ATM VP Protection Switching and Applications", Proceedings of International Switching Symposium, P.g20, pp. 82–86, April, 1995).

Figure 1:
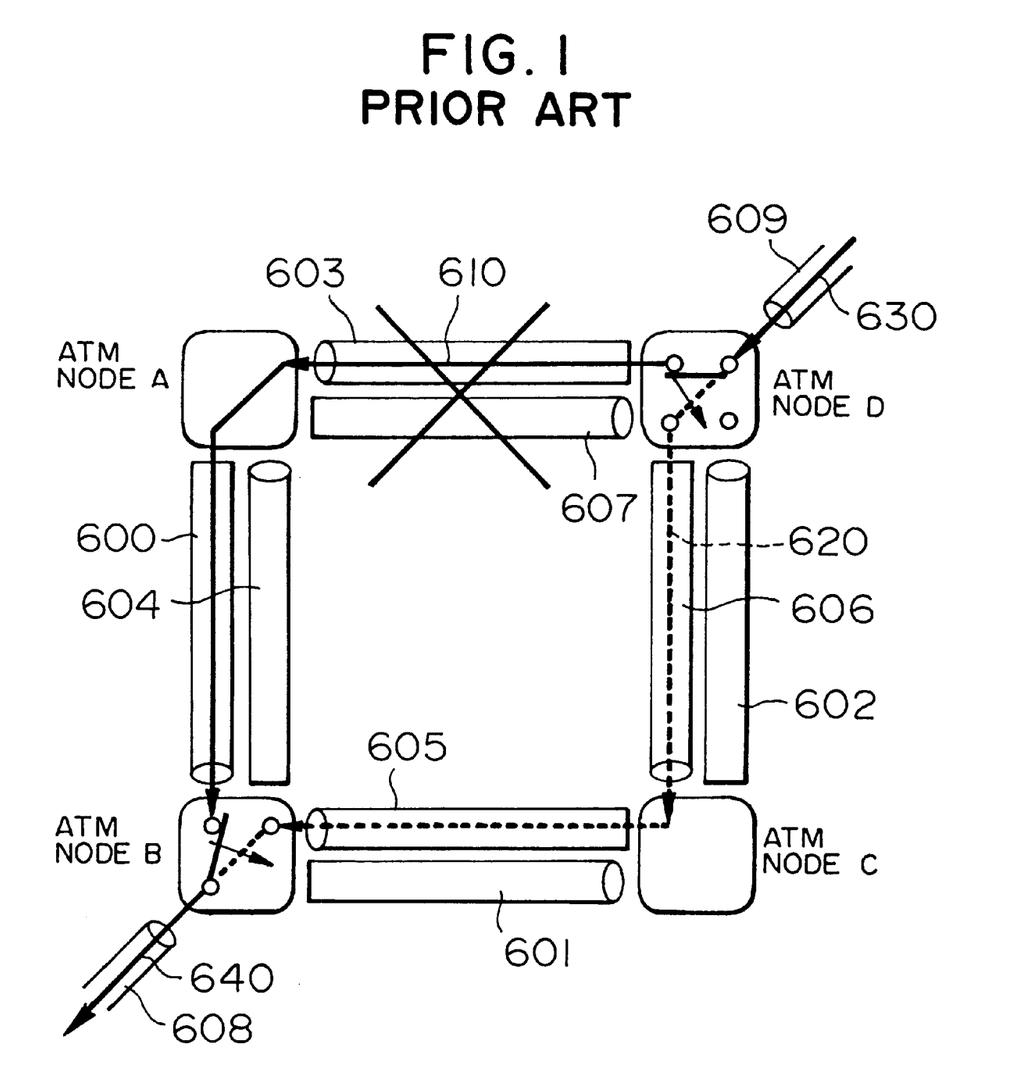
FIG. 1 is a view for explaining a conventional virtual path switching technique.

FIG. 1 is a view for explaining the conventional ATM virtual path switching method.

In FIG. 1, ATM nodes A to D are connected via links 600 to 607. A signal is transferred counterclockwise in the links 600 to 603, and clockwise in the links 604 to 607. Links 608 and 609 are connected to the nodes B and D, respectively.

A virtual path 610 is set in the links 600 and 603 between the counterclockwise nodes B and D. The node D transmits a cell on a virtual path 630 in the link 609 to the node B through the virtual path 610. The node B receives the cell on the virtual path 610, which is transmitted from the node D, and outputs it onto a virtual path 640 in the link 608. The upstream and downstream terminal nodes of the virtual path 610 are the nodes D and B, respectively. For the virtual path 610, a stand-by virtual path 620 to which the same band as that of the virtual path 610 is assigned is set in the clockwise links 605 and 606 in advance, thereby preparing for any fault in the network.

A method of detouring a cell transmitted through the virtual path 610 to the stand-by virtual path 620 when faults have occurred in the links 603 and 607 will be described next. When a fault occurs in the link 603, the node A detects the fault in the link 603 and determines that the fault will cause a fault in the virtual path 610. The node A as a fault detection node of the link and virtual path notifies the node B as the downstream terminal node of the virtual path 610 of the fault in the virtual path 610.

Upon being notified of the fault in the virtual path 610 by the node A, the node B notifies the node D as the upstream terminal node of the virtual path 610 of the fault in the virtual path 610.

Upon being notified of the fault in the virtual path 610 by the node B, the node D switches the virtual path 610 to the stand-by virtual path 620 to detour the cell from the virtual path 630 in the link 609 connected to the virtual path 610 to the stand-by virtual path 620. Next, via the virtual path 620, the node D notifies the node B of completion of switching from the virtual path 610 to the virtual path 620.

When the node D notifies the node B of completion of virtual path switching, the node B switches the virtual path connected to the virtual path 640 in the link 608 from the virtual path 610 to the virtual path 620 and outputs the cell from the virtual path 620 to the virtual path 640 in the link 608.

As described above, conventionally, when a fault occurs in the link 603, the fault is detected in units of virtual paths in the link 603. The upstream and downstream terminal nodes D and B of the virtual path are notified of the fault, and the virtual path 610 is switched to the stand-by virtual path 620.

Conventionally, since the fault detection means is arranged in units of virtual paths, fault detection and switching to a stand-by virtual path are independently performed in units of virtual paths. In one link, only a faulty virtual path is switched without affecting the remaining virtual paths having no fault.

However, the first problem of the prior art is that when faults are detected from a number of virtual paths, the processing load for generation or transmission of link fault notification signals increases, and accordingly, the virtual paths take a long time to recover from the faults.

The reason for this is as follows. The terminal nodes must be notified of faults in units of virtual paths. Even for virtual paths sharing the upstream or downstream terminal node, link fault notification signals corresponding to the number of the faulty virtual paths occur at the fault detection node and transmitted to the terminal node.

The second problem is as follows. When fault occur, and the number of virtual paths which must be switched is large, the processing load for generation and transmission of control signals which are transferred between the two, i.e., the upstream and downstream terminal nodes to switch the virtual paths increases, and accordingly, the virtual paths take a long time to recover from the faults.

This is because when a plurality of virtual paths share the upstream or downstream terminal node, communication of control signals for switching the virtual paths must be performed in correspondence with the number of virtual paths.

SUMMARY OF THE INVENTION

It is an object of the present invention to provide an ATM virtual path switching node capable of solving the problems of the prior art, utilizing the advantages of the conventional fault detection means, and reducing the processing load for generation and transmission of a link fault notification signal and a control signal for switching to allow a virtual path to recover from a fault in a short time.

In order to achieve the above object, according to the first aspect of the present invention, there is provided an ATM virtual path switching node which is connected to a plurality of links for transmitting a cell in an ATM network and can switch a current virtual path set in each of the plurality of links in advance and used to provide a service to a stand-by virtual path set in advance for detour when a fault occurs in the ATM network, comprising:

a switch for switching the current virtual path and the stand-by virtual path;

a routing table which is referred to when the current virtual path and the stand-by virtual path are to be switched by the switch;

a routing table control unit for rewriting the routing table;

a virtual path monitoring unit for monitoring a fault in the current virtual path in units of links;

a link fault determination unit for, upon being notified of a faulty current virtual path by the virtual path monitoring unit, comparing the number of current faulty virtual paths notified in units of links with a predetermined threshold value, the link fault determination unit determining, when the number of faulty current virtual paths is equal to or larger than the threshold value, that a fault has occurred in the link, and determining, when the number of faulty current virtual paths is smaller than the threshold value, that a fault has occurred in the current virtual path notified from the virtual path monitoring unit;

a current virtual path information management unit for managing correspondence between the current virtual path having, as one switching terminal, a self ATM virtual path switching node and the plurality of links in the ATM network;

a stand-by virtual path information management unit for managing correspondence between the current virtual path and the stand-by virtual path;

a message communication unit for transmitting/receiving a fault notification signal representing the fault in the current virtual path, a fault notification signal representing the fault in the link, and a switching control signal for designating switching from the current virtual path to the stand-by virtual path to/from another ATM virtual path switching node via the link; and a switching control unit connected to the link fault determination unit, the current virtual path information management unit, the stand-by virtual path information management unit, the routing table control unit, and the message communication unit to control switching from the current virtual path to the stand-by virtual path.

According to the second aspect of the present invention, there is provided an ATM virtual path switching node comprising:

a switch for switching the current virtual path and the stand-by virtual path;

a routing table which is referred to when the current virtual path and the stand-by virtual path are to be switched by the switch;

a routing table control unit for rewriting the routing table;

a virtual path monitoring unit for monitoring a fault in the current virtual path in units of links;

a current virtual path information management unit for managing correspondence between the current virtual path having, as one switching terminal, a self ATM virtual path switching node and the plurality of links in the ATM network;

a stand-by virtual path information management unit for managing correspondence between the current virtual path and the stand-by virtual path;

a representative virtual path selection unit for managing, in the current virtual paths having the self ATM virtual path switching node as one switching terminal, current virtual paths sharing the other switching terminal, and selecting, as a representative virtual path, one of at least one current virtual path sharing the switching terminal;

a message communication unit for transmitting/receiving a fault notification signal representing the fault in the current virtual path, a fault notification signal representing the fault in the link, and a switching control signal for designating switching from the current virtual path to the stand-by virtual path to/from another ATM virtual path switching node via the link; and a switching control unit connected to the current virtual path information management unit, the stand-by virtual path information management unit, the routing table control unit, the representative virtual path selection unit, and the message communication unit to control switching from the at least one current virtual path to the stand-by virtual path in accordance with the switching control signal transmitted/received in units of representative virtual paths.

According to the third aspect of the present invention, there is provided an ATM virtual path switching node comprising:

a switch for switching the current virtual path and the stand-by virtual path;

a routing table which is referred to when the current virtual path and the stand-by virtual path are to be switched by the switch;

a routing table control unit for rewriting the routing table;

a virtual path monitoring unit for monitoring a fault in the current virtual path in units of links;

a link fault determination unit for, upon being notified of a faulty current virtual path by the virtual path monitoring unit, comparing the number of faulty current virtual paths notified in units of links with a predetermined threshold value, the link fault determination unit determining, when the number of faulty current virtual paths is equal to or larger than the threshold value, that a fault has occurred in the link, and determining, when the number of faulty current virtual paths is smaller than the threshold value, that a fault has occurred in the current virtual path notified from the virtual path monitoring unit;

a current virtual path information management unit for managing correspondence between the current virtual path having, as one switching terminal, a self ATM virtual path switching node and the plurality of links in the ATM network;

a stand-by virtual path information management unit for managing correspondence between the current virtual path and the stand-by virtual path;

a representative virtual path selection unit for managing, in the current virtual paths having the self ATM virtual path switching node as one switching terminal, current virtual paths sharing the other switching terminal, and selecting, as a representative virtual path, one of at least one current virtual path sharing the switching terminal;

a message communication unit for transmitting/receiving a fault notification signal representing the fault in the current virtual path, a fault notification signal representing the fault in the link, and a switching control signal for designating switching from the current virtual path to the stand-by virtual path to/from another ATM virtual path switching node via the link; and a switching control unit connected to the link fault determination unit, the current virtual path information management unit, the stand-by virtual path information management unit, the routing table control unit, the representative virtual path selection unit, and the message communication unit to control switching from the at least one current virtual path to the stand-by virtual path in accordance with the switching control signal transmitted/received in units of representative virtual paths.

According to the fourth aspect of the present invention, there is provided an ATM virtual path switching node comprising:

a switch for switching the current virtual path and the stand-by virtual path;

a routing table which is referred to when the current virtual path and the stand-by virtual path are to be switched by the switch;

a routing table control unit for rewriting the routing table;

a link monitoring unit for monitoring a fault in each of the plurality of links;

a virtual path monitoring unit for monitoring a fault in the current virtual path in units of links;

a link fault determination unit for, upon determining on the basis of notification from the link monitoring unit that a fault has occurred in the link, or upon being notified of a faulty current virtual path by the virtual path monitoring unit, comparing the number of faulty current virtual paths notified in units of links with a predetermined threshold value, the link fault determination unit determining, when the number of faulty current virtual paths is equal to or larger than the threshold value, that a fault has occurred in the link, and determining, when the number of faulty current virtual paths is smaller than the threshold value, that a fault has occurred in the current virtual path notified from the virtual path monitoring unit;

a current virtual path information management unit for managing correspondence between the current virtual path having, as one switching terminal, a self ATM virtual path switching node and the plurality of links in the ATM network;

a stand-by virtual path information management unit for managing correspondence between the current virtual path and the stand-by virtual path;

a representative virtual path selection unit for managing, in the current virtual paths having the self ATM virtual path switching node as one switching terminal, current virtual paths sharing the other switching terminal, and selecting, as a representative virtual path, one of at least one current virtual path sharing the switching terminal;

a message communication unit for transmitting/receiving a fault notification signal representing the fault in the current virtual path, a fault notification signal representing the fault in the link, and a switching control signal for designating switching from the current virtual path to the stand-by virtual path to/from another ATM virtual path switching node via the link; and a switching control unit connected to the link fault determination unit, the current virtual path information management unit, the stand-by virtual path information management unit, the routing table control unit, the representative virtual path selection unit, and the message communication unit to control switching from the at least one current virtual path to the stand-by virtual path in accordance with the switching control signal transmitted/received in units of representative virtual paths.

In the first aspect, when the number of faulty virtual paths is smaller than the predetermined threshold value, the link fault determination unit does not determine a link fault. The message communication unit notifies the downstream switching terminal of virtual path faults in units of virtual paths. When the number of faulty virtual paths is equal to or larger than the predetermined threshold value, the link fault determination unit determines a link fault. The message communication unit notifies a neighboring ATM virtual path switching node of the link fault. The current virtual path information management unit specifies the current virtual paths accommodated in the link with the fault, and each faulty current virtual path is switched to a stand-by virtual path.

In the second aspect, virtual path faults are detected, and the downstream switching terminal is notified of virtual path faults in units of virtual paths. Thereafter, the representative virtual path selection unit selects, as a representative virtual path, one of the faulty virtual paths and sharing the switching terminal. The switching control unit switches the remaining virtual paths in accordance with the switching control signal exchanged to switch the representative virtual path.

In the third aspect, when the number of faulty virtual paths is smaller than the predetermined threshold value, the link fault determination unit does not determine a link fault. The message communication unit notifies the downstream switching terminal of virtual path faults in units of virtual paths. When the number of faulty virtual paths is equal to or larger than the predetermined threshold value, the link fault determination unit determines a link fault. The message communication unit notifies a neighboring ATM virtual path switching node of the link fault. The current virtual path information management unit specifies the current virtual path accommodated in the link with the fault. The representative virtual path selection unit selects, as a representative virtual path, one of the faulty virtual paths and sharing the switching terminal. The switching control unit switches each faulty virtual path to a stand-by virtual path in accordance with the switching control signal exchanged to switch the representative virtual path.

In the fourth aspect, the representative virtual path selection unit selects, as a representative virtual path, one of the faulty virtual paths and sharing the switching terminal. The switching control unit switches each faulty virtual path to a stand-by virtual path in accordance with the switching control signal exchanged to switch the representative virtual path.

The present invention having the above aspects has the following functions/effects.

The first effect is as follows. According to the ATM virtual path switching node of the present invention, when virtual path faults are detected, and the number of faulty virtual paths is smaller than the predetermined threshold value, the downstream switching terminal is notified of the virtual path faults in units of virtual paths. When the number of faulty virtual paths is equal to or larger than the predetermined threshold value, the neighboring ATM virtual path switching node is notified of a link fault, and the current virtual paths accommodated in the faulty link are specified and switched to stand-by virtual paths. With this arrangement, without using any link monitoring unit for directly detecting the link fault, virtual path switching can be performed at a higher speed than the prior art.

The reason for this is as follows. Only when the number of virtual paths from which faults are detected is small, a virtual path fault notification signal is sent in units of virtual paths. When the number of virtual path from which faults are detected is large and exceeds the threshold value, a link fault notification signal is sent. Therefore, the number of fault notification signals decreases, as compared to the prior art.

The second effect is as follows. According to the ATM virtual path switching node of the present invention, virtual path faults are detected, and the downstream switching terminal is notified of the virtual path faults in units of virtual paths. One of the faulty virtual paths sharing the switching terminal is selected as a representative virtual path, and the remaining virtual paths are switched in accordance with the switching control signal exchanged to switch the representative virtual path. With this arrangement, again, high-speed virtual path switching can be attained.

This is because since the switching control signal exchanged to switch the representative virtual path is used to switch one or more virtual paths, the number of switching control signals decreases, as compared to the prior art.

The third effect is as follows. According to the ATM virtual path switching node of the present invention, when virtual path faults are detected, and the number of faulty virtual paths is smaller than the predetermined threshold value, the downstream switching terminal is notified of the virtual path faults in units of virtual paths. When the number of faulty virtual paths is equal to or larger than the predetermined threshold value, the neighboring ATM virtual path switching node is notified of a link fault, and the current virtual paths accommodated in the faulty link are specified and switched to stand-by virtual paths. According to the ATM virtual path switching node of the present invention, when a virtual path fault is notified, one of the faulty virtual paths sharing the switching terminal is selected as a representative virtual path, and the remaining virtual paths are switched in accordance with the switching control signal exchanged to switch the representative virtual path. This arrangement can cope with a fault in a virtual path, which is not determined as a link fault, at a high speed.

The reason for this is as follows. The link fault is indirectly detected on the basis of the number of virtual paths, and the fault need not be notified in units of virtual paths. In addition, as one or more virtual paths are switched using the switching control signal exchanged to switch the representative virtual path, the number of switching control signals decreases, as compared to the prior art.

The fourth effect is as follows. According to the ATM virtual path switching node of the present invention, when virtual path faults are detected, and the number of faulty virtual paths is smaller than the predetermined threshold value, the downstream switching terminal is notified of the virtual path faults in units of virtual paths. When the number of faulty virtual paths is equal to or larger than the predetermined threshold value, the neighboring ATM virtual path switching node is notified of a link fault, and the current virtual paths accommodated in the faulty link are specified and switched to stand-by virtual paths. According to the ATM virtual path switching node of the present invention, when a link fault is detected, the neighboring ATM virtual path switching node is notified of the link fault. The current virtual paths accommodated in the faulty link are specified and switched to stand-by virtual paths. According to the ATM virtual path switching node of the present invention, one of the faulty virtual paths sharing the switching terminal is selected as a representative virtual path, and the remaining virtual paths are switched in accordance with the switching control signal exchanged to switch the representative virtual path. This arrangement can cope with a fault in a virtual path, which is not determined as a link fault, at a high speed.

This is because, since link faults can be more quickly detected by the link monitoring unit as compared to indirect link fault detection based on the number of virtual paths, and one or more virtual paths are switched using the switching control signal exchanged to switch the representative virtual path, the number of switching control signals decreases, as compared to the prior art.

The above and many other objects, features and advantages of the present invention will become manifest to those skilled in the art upon making reference to the following detailed description and accompanying drawings in which preferred embodiments incorporating the principles of the present invention are shown by way of illustrative example.

DETAILED DESCRIPTION OF THE PREFERRED EMBODIMENTS

Some preferred embodiments of the present invention will be described below in detail with reference to the accompanying drawings (FIGS. 2A to 5).

Figure 2A:
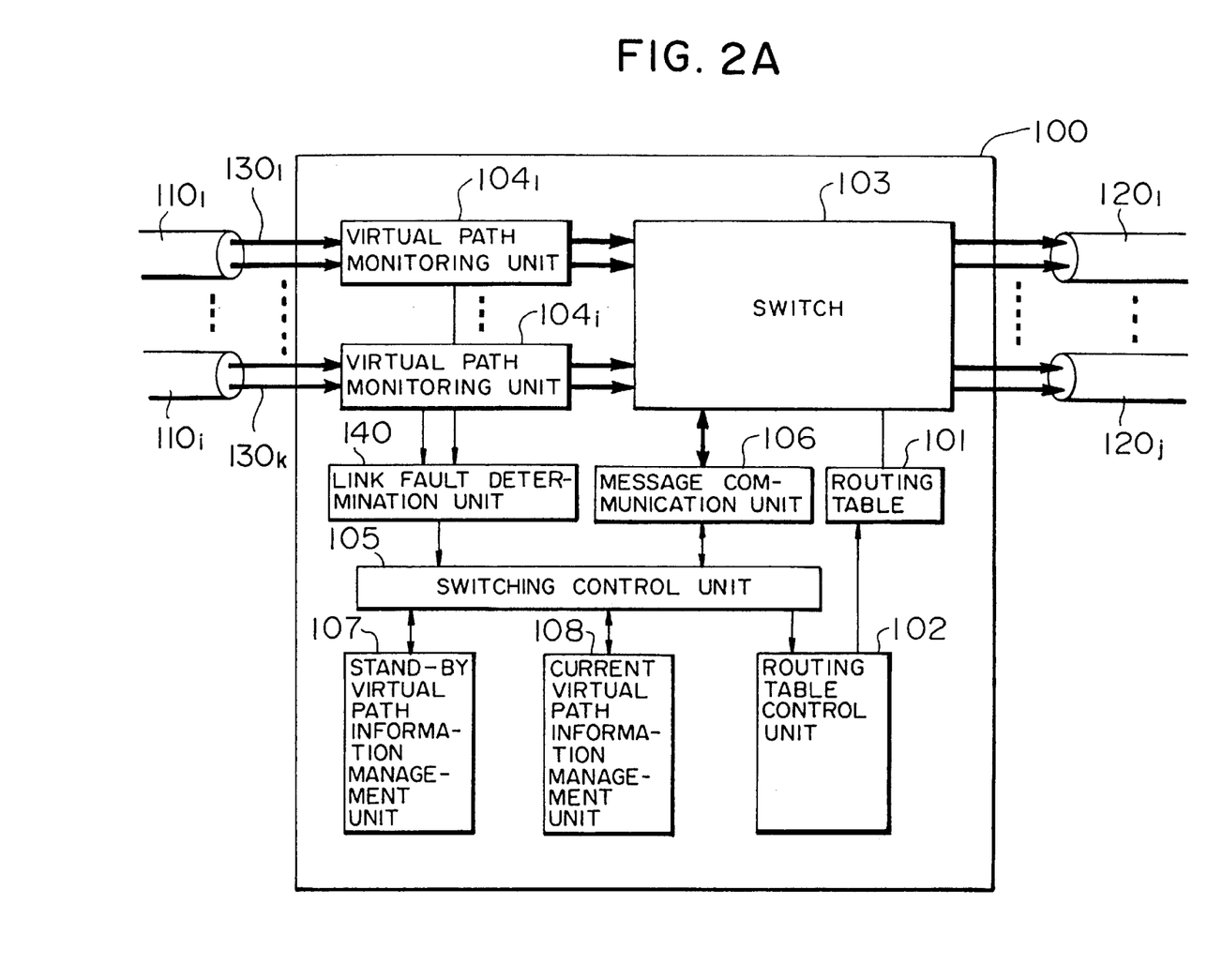
FIGS. 2A and 2B are, respectively, a view showing the arrangement of an ATM virtual path switching node according to the first embodiment of the present invention and a view for explaining virtual path switching in the node.

FIG. 2A shows an ATM virtual path switching node according to the first embodiment of the present invention. Referring to FIG. 2A, reference numeral 100 denotes an ATM virtual path switching node; $110_1$ to $110_i$, input links; $120_1$ to $120_j$, output links; and $130_1$ to $130_k$, virtual paths. The ATM virtual path switching node 100 switches the virtual paths $130_1$ to $130_k$ between the input links $110_1$ to $110_i$ and the output links $120_1$ to $120_j$.

The ATM virtual path switching node 100 comprises a routing table 101, a routing table control unit 102, a switch 103, a virtual path monitoring units $104_1$ to $104_i$, a switching control unit 105, a message communication unit 106, a stand-by virtual path information management unit 107, a current virtual path information management unit 108, and a link fault determination unit 140. The virtual path monitoring units $104_1$ to $104_i$ are arranged in correspondence with the input links $110_1$ to $110_i$, respectively.

The virtual path monitoring units $104_1$ to $104_i$ detect faults in virtual paths (to be referred to as current virtual paths) currently in use and notify the link fault determination unit 140 of the faulty current virtual paths.

For the link fault determination unit 140, a threshold value is set in advance. The link fault determination unit 140 counts faulty virtual paths notified from each of the virtual path monitoring units $104_1$ to $104_i$. When the count result is equal to or larger than the threshold value, it is determined that a fault (link fault) has occurred in an input link in which the number of faulty virtual paths is equal to or larger than the threshold value. The switching control unit 105 is notified of the input link with the fault.

The link fault determination unit 140 counts faulty virtual paths notified from each of the virtual path monitoring units $104_1$ to $104_i$. When the count result is smaller than the threshold value, it is determined that no fault (link fault) has occurred in the input link. The switching control unit 105 is notified of faulty current virtual paths.

When the link fault determination unit 140 notifies the switching control unit 105 of a faulty input link, the switching control unit 105 notifies the message communication unit 106 of the faulty input link.

In accordance with notification from the switching control unit 105, the message communication unit 106 transmits a link fault notification signal representing the input link with the fault to a neighboring ATM virtual path switching node.

Upon being notified of a faulty input link from the link fault determination unit 140, the switching control unit 105 inquires of the current virtual path information management unit 108 about, in the current virtual paths accommodated in the input link, current virtual paths using the ATM virtual path switching node 100 as a switching terminal.

The current virtual path information management unit 108 manages, in units of links, current virtual paths using the ATM virtual path switching node 100 as a switching terminal in the current virtual paths accommodated in each link in the ATM network. In response to an inquiry from the switching control unit 105, the current virtual path information management unit 108 notifies the switching control unit 105 of the current virtual paths which are accommodated in the faulty input link in the input links $110_1$ to $110_i$ and use the ATM virtual path switching node 100 as a switching terminal.

Upon being notified of current virtual paths having the ATM virtual path switching node 100 as a switching terminal from the current virtual path information management unit 108, the switching control unit 105 inquires of the stand-by virtual path information management unit 107 about a stand-by virtual path which is set for each current virtual path in advance.

The stand-by virtual path information management unit 107 manages, in units of current virtual paths, a stand-by virtual path set in advance for each current virtual path. In response to an inquiry from the switching control unit 105, the stand-by virtual path information management unit 107 determines the stand-by virtual path for each current virtual path and notifies the switching control unit 105 of the virtual path identifier of the stand-by virtual path. A two-way stand-by virtual path has two virtual path identifiers, i.e., an output link virtual path identifier used in the output link from the self ATM virtual path switching node to the neighboring ATM virtual path switching node, and an input link virtual path identifier used in the input link from the neighboring ATM virtual path switching node to the self ATM virtual path switching node.

The switching control unit 105 notifies the routing table control unit 102 of the output link virtual path identifier of the two virtual path identifiers of a stand-by virtual path for each current virtual path, which are notified from the stand-by virtual path information management unit 107.

The routing table control unit 102 rewrites the output link virtual path identifier of the current virtual path to that of the stand-by virtual path, which is notified from the switching control unit 105, thereby changing the routing table 101. When the output link virtual path identifier of the current virtual path is changed to that of the stand-by virtual path in the routing table 101, the switch 103 transmits a cell to an ATM virtual path switching node serving as the other switching terminal via the stand-by virtual path.

In addition, when the routing table 101 is rewritten to the output link virtual path identifier of the stand-by virtual path, which is notified from the switching control unit 105, the switching control unit 105 notifies the message communication unit 106 of transmission of a switching control signal for designating the ATM virtual path switching node serving as the other switching terminal to switch the current virtual path to the stand-by virtual path.

Upon being notified of transmission of the switching control signal from the control switching unit 105, the message communication unit 106 transmits a switching control signal to the ATM virtual path switching node as the other switching terminal.

The operation of the ATM virtual path switching node serving as the other switching terminal, which receives the switching control signal from the first ATM virtual path switching node, will be described next with reference to FIG. 2A.

When the message communication unit 106 of the ATM virtual path switching node serving as the other switching terminal receives the switching control signal, the switching control unit 105 inquires of the stand-by virtual path information management unit 107 about the output link virtual path identifier and the input link virtual path identifier of the stand-by virtual path for the current virtual path to be switched.

The switching control unit 105 notifies the routing table control unit 102 of the two virtual path identifiers of the stand-by virtual path for the current virtual path, which are notified from the stand-by virtual path information management unit 107. The routing table control unit 102 rewrites the output link virtual path identifier and the input link virtual path identifier of the current virtual path to those of a stand-by virtual path, which are received from the switching control unit 105, thereby changing the routing table 101.

When the output link virtual path identifier and the input link virtual path identifier of the current virtual path are changed to those of the stand-by virtual path in the routing table 101, the switch 103 receives a cell from the first ATM virtual path switching node and transmits a cell to the first ATM virtual path switching node via the stand-by virtual path.

When the output link virtual path identifier and the input link virtual path identifier are rewritten to change the routing table 101, the switching control unit 105 of the ATM virtual path switching node serving as the other switching terminal notifies the message communication unit 106 of transmission of the switching control signal for designating the first ATM virtual path switching node to switch the current virtual path to the stand-by virtual path.

When the message communication unit 106 of the first ATM virtual path switching node receives the switching control signal, the switching control unit 105 notifies the routing table control unit 102 of the input link virtual path identifier which has already been sent from the stand-by virtual path information management unit 107 in response to an inquiry.

The routing table control unit 102 of the first ATM virtual path switching node rewrites the input link virtual path identifier of the current virtual path to that of the stand-by virtual path notified by the switching control unit 105, thereby changing the routing table 101. When the input link virtual path identifier of the current virtual path is changed to that of the stand-by virtual path in the routing table 101, the switch 103 receives a cell from the other ATM virtual path switching node via the stand-by virtual path.

The operation of the neighboring ATM virtual path switching node which receives the link fault notification signal from the first ATM virtual path switching node will be described next with reference to FIG. 2A.

When the message communication unit 106 of the neighboring ATM virtual path switching node receives a link fault notification signal, and the switching control unit 105 is notified of a faulty link, the switching control unit 105 notifies the message communication unit 106 of the faulty link. In accordance with notification from the switching control unit 105, the message communication unit 106 transmits a link fault notification signal representing the link involved with the link fault to another neighboring ATM virtual path switching node.

Switching from a current virtual path to a stand-by virtual path in the neighboring ATM virtual path switching node is executed as in the first ATM virtual path switching node.

The link fault determination unit 140 counts faulty virtual paths notified from each of the virtual path monitoring units 104₁ to 104ᵢ. When the count result is smaller than the threshold value, it is determined that no fault (link fault) has occurred in the input link. The switching control unit 105 is notified of faulty current virtual paths.

In this case, the conventional scheme can be applied to the subsequent switching operation because fault detection is performed in units of virtual paths.

As described above, in the ATM virtual path switching node of the first embodiment of the present invention, when virtual path faults are detected, and the number of faulty virtual paths is smaller than the predetermined threshold value, the downstream switching terminal is notified of virtual path faults in units of virtual paths. When the number of faulty virtual paths is equal to or larger than the predetermined threshold value, the neighboring ATM virtual path switching node is notified of link fault, and the current virtual paths accommodated in the link with the fault are specified. With this operation, each current virtual path can be switched to a stand-by virtual path. Even when fault occur in a number of virtual paths, a link fault notification signal is transferred without requiring the link monitoring means for directly detecting the link fault. For this reason, the number of link fault notification signals decreases as compared to the prior art, and high-speed virtual path switching can be realized.

A virtual path switching method using the ATM virtual path switching node according to the first embodiment of the present invention shown in FIG. 2A will be described with reference to FIG. 2B.

Figure 2B:
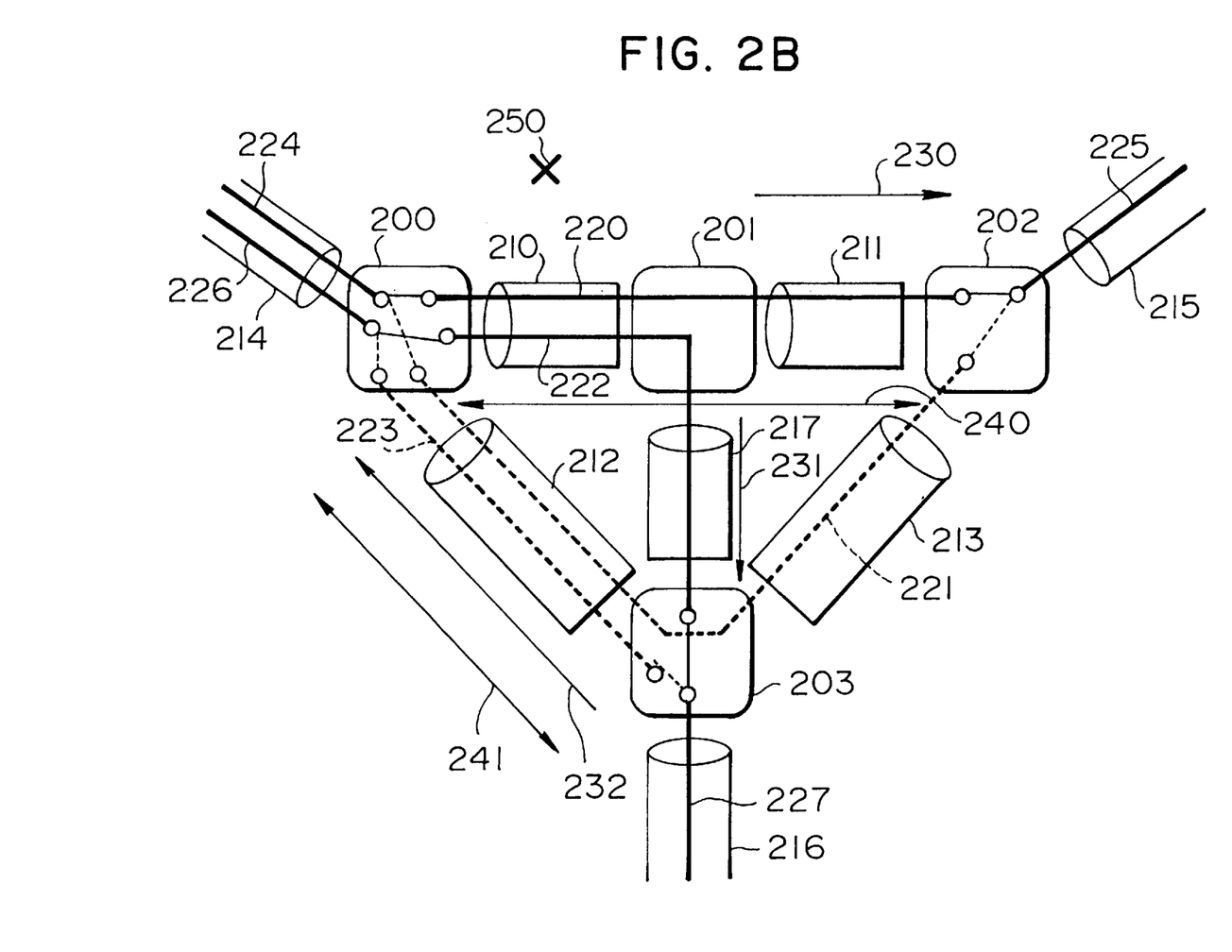

Referring to FIG. 2B, reference numerals 200 to 203 denote ATM virtual path switching nodes each corresponding to the ATM virtual path switching node 100 according to the first embodiment of the present invention; 210 to 217, links each including an input link and an output link for the descriptive convenience; and 220 to 227, virtual paths. The stand-by virtual paths 221 and 223 are set for the current virtual paths 220 and 222, respectively. Reference numerals 230 to 233 denote link fault notification signals, 240 and 241, switching control signals, and 250, a fault that has occurred in the section between the ATM virtual path switching nodes 200 and 201.

The virtual path 224 in the link 214 is connected to the current virtual path 220 at the ATM virtual path switching node 200. The current virtual path 220 is connected to the virtual path 225 in the link 215 at the ATM virtual path switching node 202. A cell is transferred between the ATM virtual path switching node 200 and the ATM virtual path switching node 202 via the current virtual path 220.

The virtual path 226 in the link 214 is connected to the current virtual path 222 at the ATM virtual path switching node 200. The current virtual path 222 is connected to the virtual path 227 in the link 216 at the ATM virtual path switching node 203. A cell is transferred between the ATM virtual path switching node 200 and the ATM virtual path switching node 203 via the current virtual path 222.

When a fault 250 is generated in the section between the ATM virtual path switching nodes 200 and 201, the ATM virtual path switching node 201 detects a virtual path fault. When the number of faulty virtual paths is smaller than the threshold value, a virtual path fault notification signal (not shown) is used to notify the downstream virtual path terminal of virtual path faults in units of virtual paths, as in the prior art.

When the number of faulty virtual paths is equal to or larger than the threshold value, the ATM virtual path switching node 201 sends a link fault notification signal 230 to the ATM virtual path switching node 202. Similarly, a link fault notification signal 231 is send from the ATM virtual path switching node 201 to the ATM virtual path switching node 203, and a link fault notification signal 232 is sent from the ATM virtual path switching node 203 to the ATM virtual path switching node 200. The link fault notification signals 230 and 231 are respectively transferred by cells on connections (not shown) which are set between the ATM virtual path switching nodes 201 and 202 and between the ATM virtual path switching nodes 201 and 203 in advance. With this operation, the ATM virtual path switching node 201 notifies the ATM virtual path switching nodes 202 and 203 of only the fault in the link 210 without notifying of faults in units of virtual paths.

Upon receiving the link fault notification signal 230, the ATM virtual path switching node 202 transmits/receives a switching control signal 240 to/from the ATM virtual path switching node 200 serving as the other switching terminal of the virtual path 220.

Upon receiving the switching control signal 240 from the ATM virtual path switching node 202, the ATM virtual path switching node 200 as the switching terminal switches the virtual path 224 connected to the virtual path 220 to the stand-by virtual path 221.

Upon receiving the switching control signal 240 from the ATM virtual path switching node 200, the ATM virtual path switching node 202 as the other switching terminal switches the virtual path 225 connected to the virtual path 220 to the stand-by virtual path 221.

Upon receiving the link fault notification signal 231, the ATM virtual path switching node 203 transmits/receives a switching control signal 241 to/from the ATM virtual path switching node 200 as the other switching terminal of the virtual path 222.

Upon receiving the switching control signal 241 from the ATM virtual path switching node 203, the ATM virtual path switching node 200 as a switching terminal switches the virtual path 226 connected to the virtual path 222 to the stand-by virtual path 223.

Upon receiving the switching control signal 241 from the ATM virtual path switching node 200, the ATM virtual path switching node 203 as the other switching terminal switches the virtual path 227 connected to the virtual path 222 to the stand-by virtual path 223.

Figure 3A:
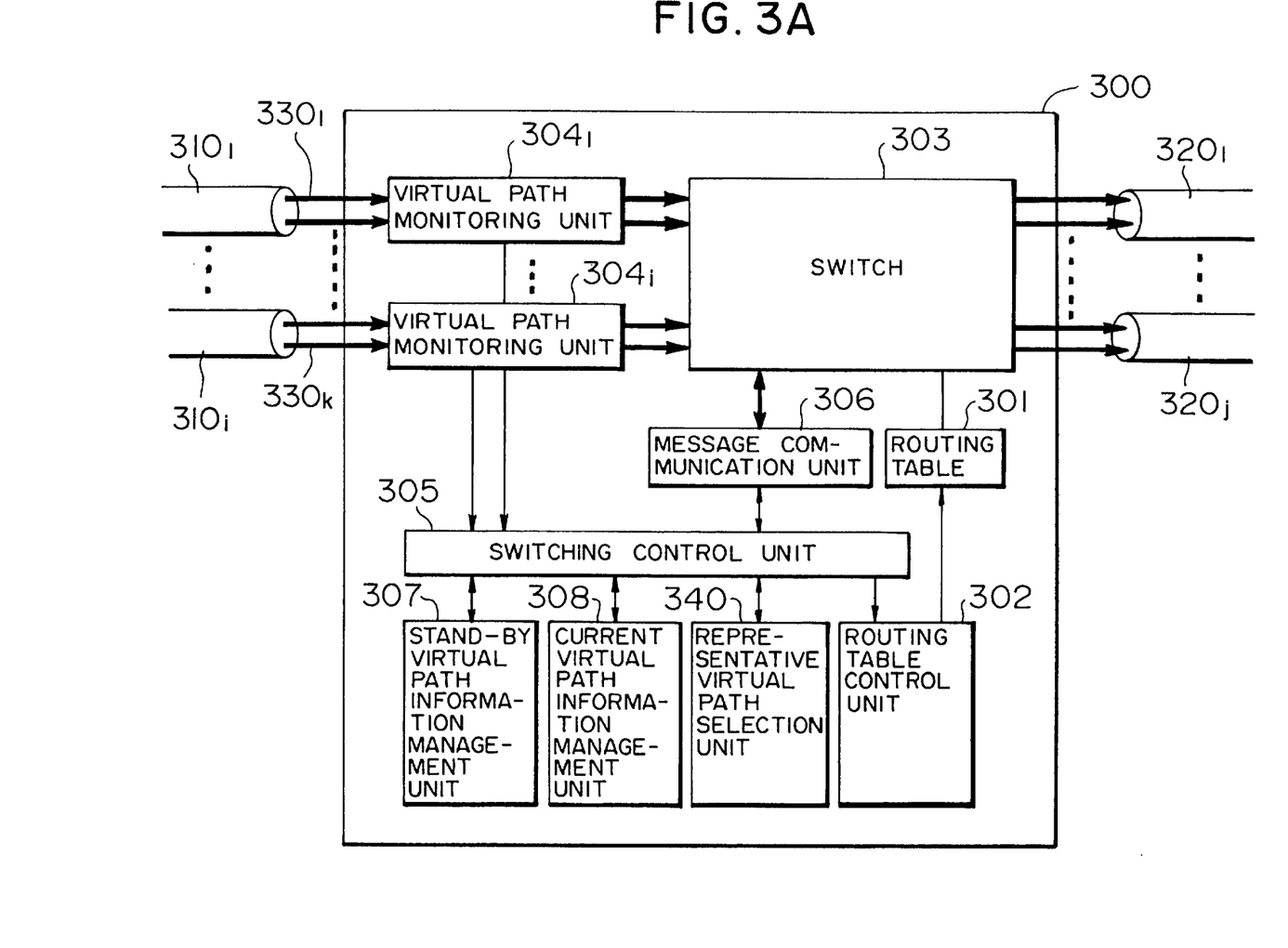
FIGS. 3A and 3B are, respectively, a view showing the arrangement of an ATM virtual path switching node according to the second embodiment of the present invention and a view for explaining virtual path switching in the node.

FIG. 3A shows an ATM virtual path switching node according to the second embodiment of the present invention. Referring to FIG. 3A, reference numeral 300 denotes an ATM virtual path switching node; $310_1$ to $310_i$, input links; $320_1$ to $320_j$, output links; and $330_1$ to $330_k$, virtual paths. The ATM virtual path switching node 300 switches the virtual paths $330_1$ to $330_k$ between the input links $310_1$ to $310_i$ and the output links $320_1$ to $320_j$.

The ATM virtual path switching node 300 comprises a routing table 301, a routing table control unit 302, a switch 303, a virtual path monitoring units $304_1$ to $304_i$, a switching control unit 305, a message communication unit 306, a stand-by virtual path information management unit 307, a current virtual path information management unit 308, and a representative virtual path selection unit 340. The virtual path monitoring units $304_1$ to $304_i$ are arranged in correspondence with the input links $310_1$ to $310_i$, respectively.

The virtual path monitoring unit $304_1$ to $304_i$ detect faults in virtual paths (to be referred to as current virtual paths) currently in use and notify the switching control unit 305 of the faulty current virtual paths.

Upon being notified of the faulty current virtual paths from the virtual path monitoring units $304_1$ to $304_i$, the switching control unit 305 instructs the message communication unit 306 to transmit a virtual path fault notification signal to an ATM virtual path switching node as the downstream switching terminal of each current virtual path in which a fault has been detected.

In accordance with notification from the switching control unit 305, the message communication unit 306 transmits a virtual path fault notification signal representing the virtual path with the fault to the ATM virtual path switching node as the downstream switching terminal.

Upon being notified of the faulty current virtual paths from the virtual path monitoring units $304_1$ to $304_i$, the switching control unit 305 inquires of the current virtual path information management unit 308 about, in the current virtual paths, a faulty current virtual path using the ATM virtual path switching node 300 as a switching terminal.

The current virtual path information management unit 308 manages, in units of links, current virtual paths using the ATM virtual path switching node 300 as a switching terminal. In response to an inquiry from the switching control unit 305, the current virtual path information management unit 308 notifies the switching control unit 305 of a faulty current virtual path using the ATM virtual path switching node 300 as a switching terminal.

Upon being notified of the current virtual path using the ATM virtual path switching node 300 as a switching terminal from the current virtual path information management unit 308, the switching control unit 305 inquires of the stand-by virtual path information management unit 307 about a stand-by virtual path which is set for the current virtual path in advance.

The stand-by virtual path information management unit 307 manages, in units of current virtual paths, a stand-by virtual path set for each current virtual path in advance. In response to an inquiry from the switching control unit 305, the stand-by virtual path information management unit 307 determines the stand-by virtual path for the current virtual path and notifies the switching control unit 305 of the virtual path identifier of the stand-by virtual path.

The switching control unit 305 notifies the routing table control unit 302 of the output link virtual path identifier of the two virtual path identifiers of the stand-by virtual path for the current virtual path, which are notified from the stand-by virtual path information management unit 307.

The routing table control unit 302 rewrites the output link virtual path identifier of the current virtual path to that of the stand-by virtual path, which is notified from the switching control unit 305, thereby changing the routing table 301.

When the output link virtual path identifier of the current virtual path is changed to that of the stand-by virtual path in the routing table 301, the switch 303 transmits a cell to an ATM virtual path switching node serving as the other switching terminal via the stand-by virtual path.

When the current virtual path information management unit 308 notifies the switching control unit 305 of the current virtual path using the ATM virtual path switching node 300 as a switching terminal, the switching control unit 305 inquires of the representative virtual path selection unit 340 about current virtual paths sharing the other switching terminal.

The representative virtual path selection unit 340 manages current virtual paths which use the ATM virtual path switching node 300 as a switching terminal and share the other switching terminal. When the switching control unit 305 inquires about current virtual paths sharing the other switching terminal, the representative virtual path selection unit 340 selects a current virtual path (representative virtual path) representing the plurality of current virtual paths sharing the switching terminal and notifies the switching control unit 305 of it. When only one current virtual path uses the switching terminal, the switching control unit 305 is notified of this current virtual path as the representative virtual path.

After the output link virtual path identifier is changed to that of the stand-by virtual path in the routing table 301, the switching control unit 305 notifies the message communication unit 306 of the representative virtual path and simultaneously directs the message communication unit 306 to transmit a switching control signal for designating to switch the current virtual path to the stand-by virtual path to the ATM virtual path switching node serving as the other switching terminal in units of representative virtual paths.

When transmission of the switching control signal is instructed from the switching control unit 305, the message communication unit 306 transmits a switching control signal to the ATM virtual path switching node serving as the other switching terminal via the representative virtual path. The switching control signal transmitted in units of representative virtual paths instructs switching of at least one current virtual path sharing the switching terminal of the representative virtual path to a stand-by virtual path.

The operation of the ATM virtual path switching node serving as the other switching terminal, which receives the switching control signal from the first ATM virtual path switching node, will be described next with reference to FIG. 3A.

When the message communication unit 306 of the ATM virtual path switching node serving as the other switching terminal receives a switching control signal, the switching control unit 305 inquires of the stand-by virtual path information management unit 307 about the output link virtual path identifier and the input link virtual path identifier of the stand-by virtual path for the current virtual path as a switching target.

The switching control unit 305 notifies the routing table control unit 302 of the two virtual path identifiers of the stand-by virtual path for the current virtual path, which are notified from the stand-by virtual path information management unit 307. The routing table control unit 302 rewrites the output link virtual path identifier and the input link virtual path identifier of the current virtual path to those of the stand-by virtual path, which are notified from the switching control unit 305, thereby changing the routing table 301.

When the output link virtual path identifier and the input link virtual path identifier of the current virtual path are rewritten to those of the stand-by virtual path in the routing table 301, the switch 303 receives a cell from the first ATM virtual path switching node and transmits a cell to the first ATM virtual path switching node via the stand-by virtual path.

When the output link virtual path identifier and the input link virtual path identifier are rewritten to change the routing table 301, the switching control unit 305 of the ATM virtual path switching node serving as the other switching terminal directs the message communication unit 306 to transmit, in units of representative virtual paths, a switching control signal for making the first ATM virtual path switching node switch the current virtual path for a received cell to a stand-by virtual path.

When the switching control unit 305 instructs to send a switching control signal, the message communication unit 306 transmits a switching control signal to the first ATM virtual path switching node as a switching terminal via the representative virtual path. The switching control signal transmitted in units of representative virtual paths is transmitted in correspondence with a control signal from the first ATM virtual path switching node.

When the message communication unit 306 of the first ATM virtual path switching node receives the switching control signal, the switching control unit 305 notifies the routing table control unit 302 of the input link virtual path identifier which has already been sent from the stand-by virtual path information management unit 307.

The routing table control unit 302 of the first ATM virtual path switching node rewrites the input link virtual path identifier of the current virtual path to that of the stand-by virtual path, which is notified from the switching control unit 305, thereby changing the routing table 301.

When the input link virtual path identifier of the current virtual path is rewritten to that of the stand-by virtual path in the routing table 301, the switch 303 receives a cell from the other ATM virtual path switching node via the stand-by virtual path.

The operation of the ATM virtual path switching node serving as the downstream switching terminal of the current virtual path, which receives the virtual path fault notification signal from the first ATM virtual path switching node, is executed as in the first ATM virtual path switching node.

As described above, in the ATM virtual path switching node according to the second embodiment of the present invention, virtual path faults are detected, and the downstream switching terminal is notified of faults in units of virtual paths. In the faulty virtual paths, one of the virtual paths which share a switching terminal is selected as a representative virtual path. The remaining virtual paths can be switched in accordance with the switching control signal exchanged to switch the representative virtual path. For this reason, the number of switching control signals decreases as compared to the prior art, and high-speed virtual path switching can be realized.

A virtual path switching method using the ATM virtual path switching node according to the second embodiment of the present invention shown in FIG. 3A will be described with reference to FIG. 3B.

Figure 3B:
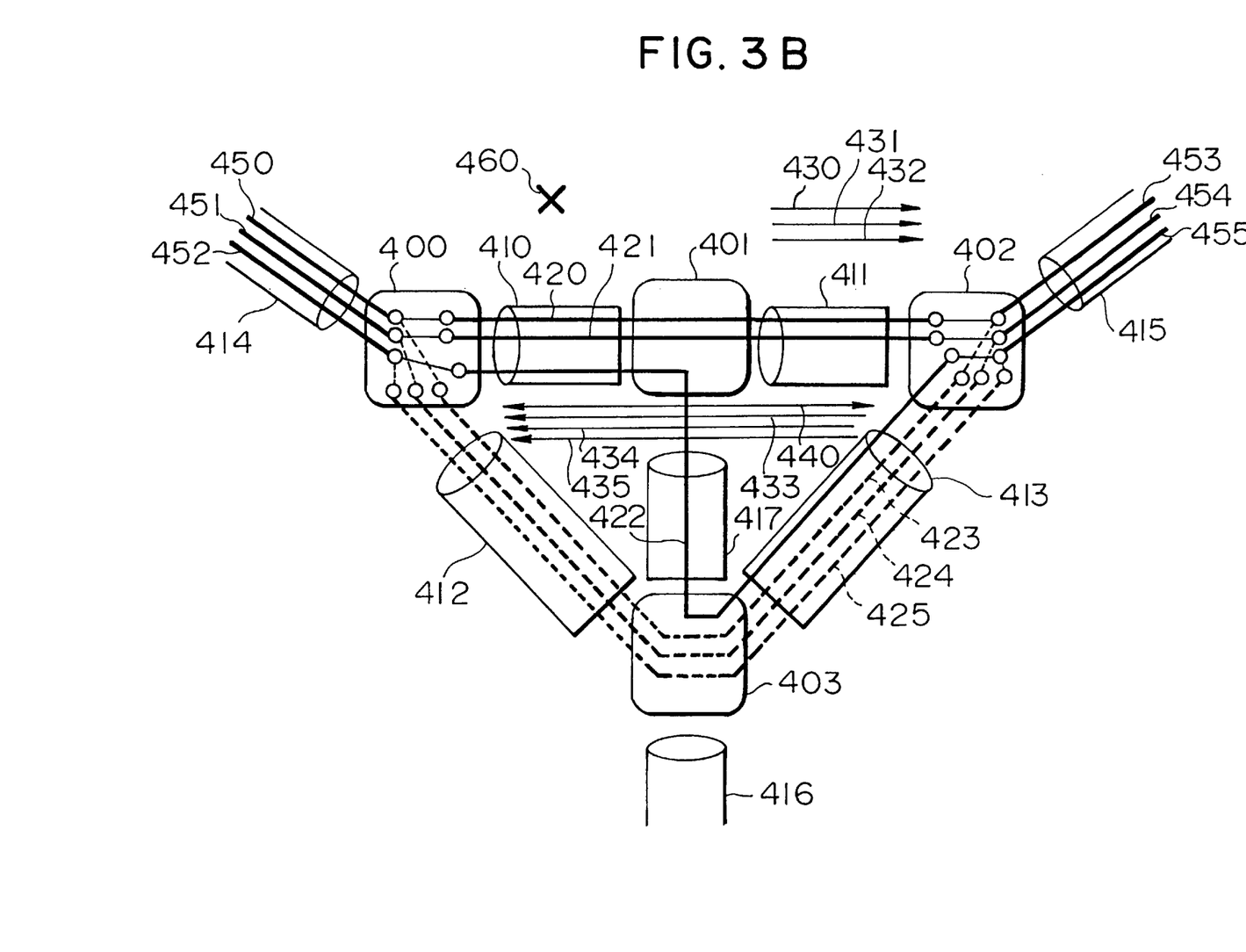

Referring to FIG. 3B, reference numerals 400 to 403 denote ATM virtual path switching nodes each corresponding to the ATM virtual path switching node 300 according to the second embodiment of the present invention in FIG. 3A; 410 to 416, links; and 420 to 425 and 450 to 455, virtual paths. The stand-by virtual paths 423, 424, and 425 are set for the current virtual paths 420, 421, and 422, respectively. Reference numerals 430 to 435 denote virtual path fault notification signals, 440, a switching control signal, and 460, a fault generated in the section between the ATM virtual path switching nodes 400 and 401.

The virtual path 450 in the link 414 is connected to the current virtual path 420 at the ATM virtual path switching node 400. The current virtual path 420 is connected to the virtual path 453 in the link 415 at the ATM virtual path switching node 402. A cell is transferred between the ATM virtual path switching node 400 and the ATM virtual path switching node 402 via the current virtual path 420.

The virtual path 451 in the link 414 is connected to the current virtual path 421 at the ATM virtual path switching node 400. The current virtual path 421 is connected to the virtual path 454 in the link 415 at the ATM virtual path switching node 402. A cell is transferred between the ATM virtual path switching node 400 and the ATM virtual path switching node 402 via the current virtual path 421.

The virtual path 452 in the link 414 is connected to the current virtual path 422 at the ATM virtual path switching node 400. The current virtual path 422 is connected to the virtual path 455 in the link 415 at the ATM virtual path switching node 402. A cell is transferred between the ATM virtual path switching node 400 and the ATM virtual path switching node 402 via the current virtual path 422.

When a fault 460 is generated in the section between the ATM virtual path switching nodes 400 and 401, the ATM virtual path switching node 401 detects the virtual path fault and notifies the ATM virtual path switching node 402 as the downstream switching terminal of the faults in the virtual paths 420 to 422 in units of virtual paths using the virtual path fault notification signals 430 to 432.

Upon receiving the virtual path fault notification signals 430 to 432, the ATM virtual path switching node 402 notifies the ATM virtual path switching node 400 as the upstream switching terminal of the faults in the virtual paths 420 to 422 by the virtual path fault notification signals 433 to 435 in units of virtual paths.

Upon receiving the virtual path fault notification signals 430 and 432, the ATM virtual path switching node 402 checks whether the virtual paths 420 to 422 share the transmission source switching terminal. Since the virtual paths 420 to 422 share the transmission source switching terminal, e.g., the virtual path 420 is set as a representative virtual path, and switching of the remaining virtual paths 421 and 422 is performed using the switching control signal 440 exchanged to switch the virtual path 420.

Upon receiving the switching control signal 440 for selecting the virtual path 420 as a representative virtual path from the ATM virtual path switching node 402, the ATM virtual path switching node 400 as the transmission source switching terminal switches the virtual paths 450, 451, and 452 connected to the virtual paths 420, 421, and 422 to the stand-by virtual paths 423, 424, and 425, respectively.

When the virtual paths are switched to the stand-by virtual paths 423, 424, and 425, the ATM virtual path switching node 400 transmits the control signal 440 for instructing switching to the stand-by virtual paths 423, 424, and 425 at the reception switching terminal to the ATM virtual path switching node 402 serving as the reception switching terminal of the representative virtual path 420, which has sent the switching control signal 440.

Upon receiving the switching control signal 440 from the ATM virtual path switching node 400, the ATM virtual path switching node 402 as the reception switching terminal switches the virtual paths 453, 454, and 455 connected to the virtual paths 420, 421, and 422 to the stand-by virtual paths 423, 424, and 425, respectively.

Figure 4:
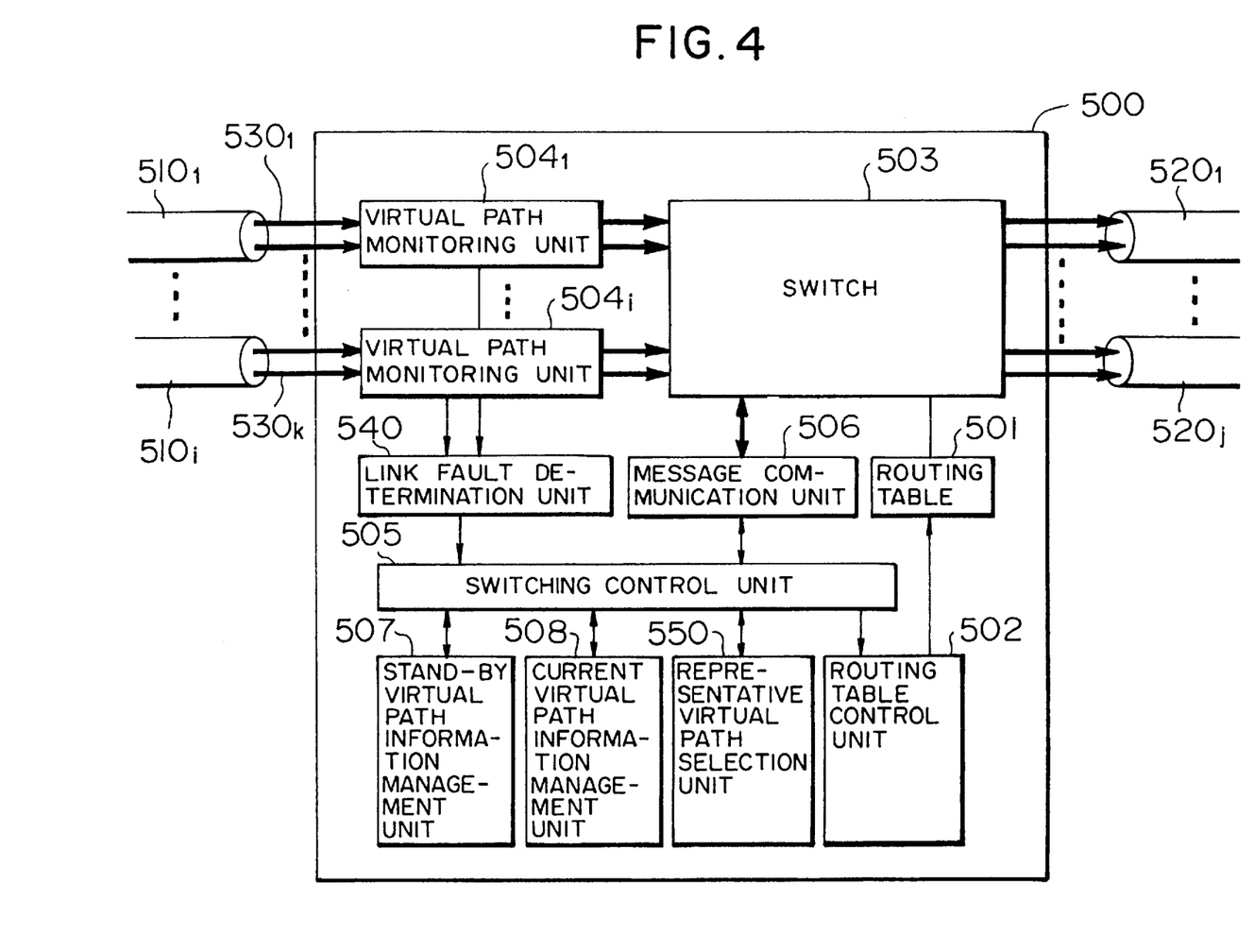
FIG. 4 is a view showing the arrangement of an ATM virtual path switching node according to the third embodiment of the present invention.

FIG. 4 shows an ATM virtual path switching node according to the third embodiment of the present invention. Referring to FIG. 4, reference numeral 500 denotes an ATM virtual path switching node; $510_1$ to $510_i$, input links; $520_1$ to $520_j$, output links; and $530_1$ to $530_k$, virtual paths. The ATM virtual path switching node 500 switches the virtual paths $530_1$ to $530_k$ between the input links $510_1$ to $510_i$ and the output links $520_1$ to $520_j$.

For the ATM virtual path switching node 500, the functions of the ATM virtual path switching nodes 100 and 300 of the first and second embodiments shown in FIGS. 2A and 3A, respectively, are combined. The ATM virtual path switching node 500 comprises a routing table 501, a routing table control unit 502, a switch 503, a virtual path monitoring units $504_1$ to $504_i$, a switching control unit 505, a message communication unit 506, a stand-by virtual path information management unit 507, a current virtual path information management unit 508, a link fault determination unit 540, and a representative virtual path selection unit 550. The virtual path monitoring units $504_1$ to $504_i$ are arranged in correspondence with the input links $510_1$ to $510_i$, respectively.

More specifically, the ATM virtual path switching node 500 has, as a fault detection means, the same function as that of the ATM virtual path switching node 100 of the first embodiment shown in FIG. 2A. As a means for exchanging a switching control signal for switching control, the ATM virtual path switching node 500 has the same function as that of the ATM virtual path switching node 300 of the second embodiment.

When virtual path faults are detected by the ATM virtual path switching node 500, and the number of faulty virtual paths is smaller than a predetermined threshold value, the downstream switching terminal is notified of virtual path faults in units of virtual paths. When the number of faulty virtual paths is equal to or larger than the predetermined threshold value, a neighboring ATM virtual path switching node can be notified of the link fault. In addition, in the faulty virtual paths, one of the virtual paths sharing a switching terminal can be selected as a representative virtual path, and the remaining virtual paths can be switched in accordance with the switching control signal exchanged to switch the representative virtual path.

Figure 5:
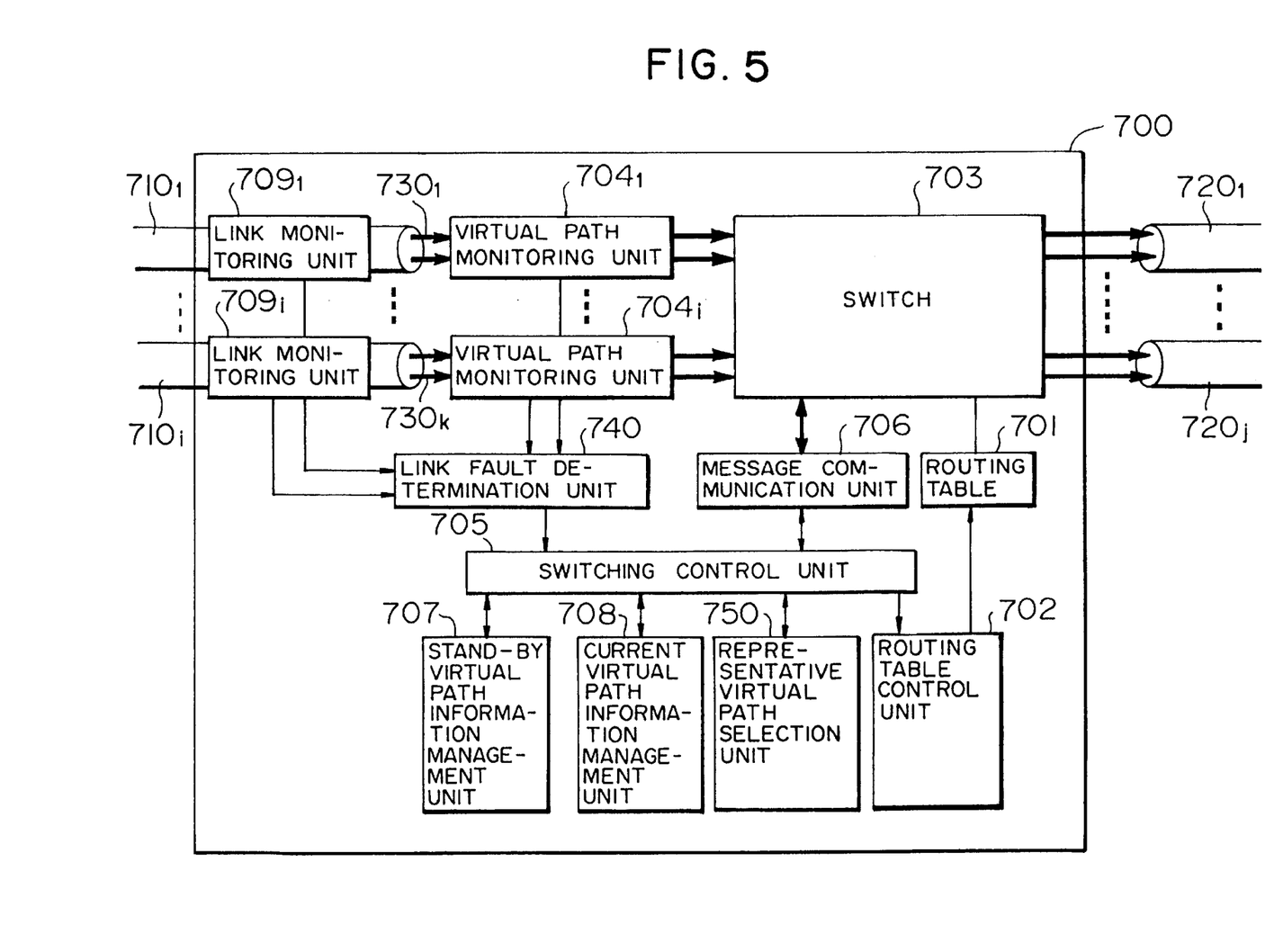
FIG. 5 is a view showing the arrangement of an ATM virtual path switching node according to the fourth embodiment of the present invention.

FIG. 5 shows an ATM virtual path switching node according to the fourth embodiment of the present invention. Referring to FIG. 5, reference numeral 700 denotes an ATM virtual path switching node; $710_1$ to $710_i$, input links; $720_1$ to $720_j$, output links; and $730_1$ to $730_k$, virtual paths. The ATM virtual path switching node 700 switches the virtual paths $730_1$ to $730_k$ between the input links $710_1$ to $710_i$ and the output links $720_1$ to $720_j$.

The ATM virtual path switching node 700 has the function of the ATM virtual path switching node 500 of the third embodiment shown in FIG. 4. The ATM virtual path switching node 700 comprises a routing table 701, a routing table control unit 702, a switch 703, a virtual path monitoring units $704_1$ to $704_i$, a switching control unit 705, a message communication unit 706, a stand-by virtual path information management unit 707, a current virtual path information management unit 708, a link fault determination unit 740, and a representative virtual path selection unit 750. The virtual path monitoring units $704_1$ to $704_i$ are arranged in correspondence with the input links $710_1$ to $710_i$, respectively. The ATM virtual path switching node 700 has not only the function of the ATM virtual path switching node 500 of the third embodiment of the present invention but also link monitoring units $709_1$ to $709_i$ for monitoring faults in the input links $710_1$ to $710_i$, respectively.

The link fault determination unit 740 counts faulty virtual paths notified from each of the virtual path monitoring units $704_1$ to $704_i$. When the count result is smaller than a threshold value, it is determined that no fault (link fault) has occurred in the input link, and the switching control unit 705 is notified of the faulty current virtual paths. The link fault determination unit 740 also determines on the basis of notification from the link monitoring unit $709_1$ to $709_i$ that faults have occurred in the input links $710_1$ to $710_i$.

More specifically, the ATM virtual path switching node 700 has, as a fault detection means, not only the same function as that of the ATM virtual path switching node 100 of the first embodiment shown in FIG. 2A but also a link fault detection means of the link monitoring unit $709_1$ to $709_i$. The difference from the ATM virtual path switching node 100 of the first embodiment shown in FIG. 2A is that the link fault can be not only indirectly detected by determining the number of faulty virtual paths but also directly detected. With this arrangement, the link fault can be more quickly detected as compared to indirect link fault detection based on the number of faulty virtual paths. In addition, even a fault in each virtual path, which cannot be detected by the link monitoring unit $709_1$ to $709_i$, can also be detected.

As a means for exchanging a switching control signal for switching control, the ATM virtual path switching node 700 has the same function as that of the ATM virtual path switching node 500 of the third embodiment. When virtual path faults are detected by the ATM virtual path switching node 700, and the number of faulty virtual paths is smaller than the predetermined threshold value, the downstream switching terminal is notified of virtual path faults in units of virtual paths. When the number of faulty virtual paths is equal to or larger than the predetermined threshold value, or when the link monitoring unit $709_1$ to $709_i$ detect link faults, a neighboring ATM virtual path switching node can be notified of the link faults. In addition, in the faulty virtual paths, one of the virtual paths sharing a switching terminal can be selected as a representative virtual path, and the remaining virtual paths can be switched in accordance with the switching control signal exchanged to switch the representative virtual path.

What is claimed is:

1. An ATM virtual path switching node which is connected to a plurality of links for transmitting a cell in an ATM network and can switch a current virtual path set in each of said plurality of links in advance and used to provide a service to a stand-by virtual path set in advance for detour when a fault occurs in said ATM network, comprising:

a switch for switching said current virtual path and said stand-by virtual path;

a routing table which is referred to when said current virtual path and said stand-by virtual path are to be switched by said switch;

a routing table control unit for rewriting said routing table;

a virtual path monitoring unit for monitoring a fault in said current virtual path in units of links;

a link fault determination unit for, upon being notified of a faulty current virtual path by said virtual path monitoring unit, comparing the number of faulty current virtual paths notified in units of links with a predetermined threshold value, said link fault determination unit determining, when the number of faulty current virtual paths is equal to or larger than the threshold value, that a fault has occurred in said link, and determining, when the number of faulty current virtual paths is smaller than the threshold value, that a fault has occurred in said current virtual path notified from said virtual path monitoring unit;

a current virtual path information management unit for managing correspondence between said current virtual path having, as one switching terminal, a self ATM virtual path switching node and said plurality of links in said ATM network;

a stand-by virtual path information management unit for managing correspondence between said current virtual path and said stand-by virtual path;

a message communication unit for transmitting/receiving a fault notification signal representing the fault in said current virtual path, a fault notification signal representing the fault in said link, and a switching control signal for designating switching from said current virtual path to said stand-by virtual path to/from another ATM virtual path switching node via said link; and a switching control unit connected to said link fault determination unit, said current virtual path information management unit, said stand-by virtual path information management unit, said routing table control unit, and said message communication unit to control switching from said current virtual path to said stand-by virtual path.

2. An ATM virtual path switching node which is connected to a plurality of links for transmitting a cell in an ATM network and can switch a current virtual path set in each of said plurality of links in advance and used to provide a service to a stand-by virtual path set in advance for routing when a fault occurs in said ATM network, comprising:

a switch for switching said current virtual path and said stand-by virtual path;

a routing table which is referred to when said current virtual path and said stand-by virtual path are to be switched by said switch;

a routing table control unit for rewriting said routing table;

a virtual path monitoring unit for monitoring a fault in said current virtual path in units of links;

a current virtual path information management unit for managing correspondence between said current virtual path having, as one switching terminal, a self ATM virtual path switching node and said plurality of links in said ATM network;

a stand-by virtual path information management unit for managing correspondence between said current virtual path and said stand-by virtual path;

a representative virtual path selection unit for managing, in said current virtual paths having said self ATM virtual path switching node as one switching terminal, current virtual paths sharing the other switching terminal, and selecting, as a representative virtual path, one of at least one current virtual path sharing said switching terminal;

a message communication unit for transmitting/receiving a fault notification signal representing the fault in said current virtual path, a fault notification signal representing the fault in said link, and a switching control signal for designating switching from said current virtual path to said stand-by virtual path to/from another ATM virtual path switching node via said link; and a switching control unit connected to said current virtual path information management unit, said stand-by virtual path information management unit, said routing table control unit, said representative virtual path selection unit, and said message communication unit to control switching from said at least one current virtual path to said stand-by virtual path in accordance with the switching control signal transmitted/received in units of representative virtual paths.

3. An ATM virtual path switching node which is connected to a plurality of links for transmitting a cell in an ATM network and can switch a current virtual path set in each of said plurality of links in advance and used to provide a service to a stand-by virtual path set in advance for routing when a fault occurs in said ATM network, comprising:

a switch for switching said current virtual path and said stand-by virtual path;

a routing table which is referred to when said current virtual path and said stand-by virtual path are to be switched by said switch;

a routing table control unit for rewriting said routing table;

a virtual path monitoring unit for monitoring a fault in said current virtual path in units of links;

a link fault determination unit for, upon being notified of a current virtual path by said virtual path monitoring unit, comparing the number of faulty current virtual paths notified in units of links with a predetermined threshold value, said link fault determination unit determining, when the number of faulty current virtual paths is equal to or larger than the threshold value, that a fault has occurred in said link, and determining, when the number of faulty current virtual paths is smaller than the threshold value, that a fault has occurred in said current virtual path notified from said virtual path monitoring unit;

a current virtual path information management unit for managing correspondence between said current virtual path having, as one switching terminal, a self ATM virtual path switching node and said plurality of links in said ATM network;

a stand-by virtual path information management unit for managing correspondence between said current virtual path and said stand-by virtual path;

a representative virtual path selection unit for managing, in said current virtual paths having said self ATM virtual path switching node as one switching terminal, current virtual paths sharing the other switching terminal, and selecting, as a representative virtual path, one of at least one current virtual path sharing said switching terminal;

a message communication unit for transmitting/receiving a fault notification signal representing the fault in said current virtual path, a fault notification signal representing the fault in said link, and a switching control signal for designating switching from said current virtual path to said stand-by virtual path to/from another ATM virtual path switching node via said link; and a switching control unit connected to said link fault determination unit, said current virtual path information management unit, said stand-by virtual path information management unit, said routing table control unit, said representative virtual path selection unit, and said message communication unit to control switching from said at least one current virtual path to said stand-by virtual path in accordance with the switching control signal transmitted/received in units of representative virtual paths.

4. An ATM virtual path switching node which is connected to a plurality of links for transmitting a cell in an ATM network and can switch a current virtual path set in each of said plurality of links in advance and used to provide a service to a stand-by virtual path set in advance for routing when a fault occurs in said ATM network, comprising:

a switch for switching said current virtual path and said stand-by virtual path;

a routing table which is referred to when said current virtual path and said stand-by virtual path are to be switched by said switch;

a routing table control unit for rewriting said routing table;

a link monitoring unit for monitoring a fault in each of said plurality of links;

a virtual path monitoring unit for monitoring a fault in said current virtual path in units of links;

a link fault determination unit for, upon determining on the basis of notification from said link monitoring unit that a fault has occurred in said link, or upon being notified of a faulty current virtual path by said virtual path monitoring unit, comparing the number of faulty current virtual paths notified in units of links with a predetermined threshold value, said link fault determination unit determining, when the number of faulty current virtual paths is equal to or larger than the threshold value, that a fault has occurred in said link, and determining, when the number of faulty current virtual paths is smaller than the threshold value, that a fault has occurred in said current virtual path notified from said virtual path monitoring unit;

a current virtual path information management unit for managing correspondence between said current virtual path having, as one switching terminal, a self ATM virtual path switching node and said plurality of links in said ATM network;

a stand-by virtual path information management unit for managing correspondence between said current virtual path and said stand-by virtual path;

a representative virtual path selection unit for managing, in said current virtual paths having said self ATM virtual path switching node as one switching terminal, current virtual paths sharing the other switching terminal, and selecting, as a representative virtual path, one of at least one current virtual path sharing said switching terminal;

a message communication unit for transmitting/receiving a fault notification signal representing the fault in said current virtual path, a fault notification signal representing the fault in said link, and a switching control signal for designating switching from said current virtual path to said stand-by virtual path to/from another ATM virtual path switching node via said link; and a switching control unit connected to said link fault determination unit, said current virtual path information management unit, said stand-by virtual path information management unit, said routing table control unit, said representative virtual path selection unit, and said message communication unit to control switching from said at least one current virtual path to said stand-by virtual path in accordance with the switching control signal transmitted/received in units of representative virtual paths.

* * * * *